UNITED STATES PATENT OFFICE.

OTTO CHRISTIAN HAGEMANN, OF LONDON, ENGLAND, ASSIGNOR TO JAMES S. KIRK & COMPANY, OF CHICAGO, ILLINOIS.

PROCESS OF PURIFYING SPENT SOAP-LYES.

SPECIFICATION forming part of Letters Patent No. 443,761, dated December 30, 1890.

Application filed September 26, 1890. Serial No. 366,256. (No specimens.) Patented in England July 2, 1885, No. 8,051.

*To all whom it may concern:*

Be it known that I, OTTO CHRISTIAN HAGEMANN, mechanical engineer, of London, England, have invented a new and useful Improvement in Treating Spent Soap-Lye, (for which I have obtained a patent in Great Britain, No. 8,051, dated July 2, 1885,) of which the following is a specification.

This invention has for its object improvements in the treatment of spent soap-lyes to obtain glycerine and other products therefrom; and my invention is particularly adapted to the treatment of lye containing certain impurities, such as hyposulphites, sulphides, sulpho-cyanates, cyanides, ferro-cyanides, &c.

In carrying out my invention I proceed as follows: I first add to the lye a small proportion of caustic lime, which combines with certain impurities in suspension and solution therein, and separate the clear lye from the precipitate thus formed. The quantity of lime required varies, necessarily, with the character of the spent lye, but from one-half of one per cent. to one and one-half per cent. of lime is usually sufficient. I then boil the lye to salting-point—*i. e.*, until it is saturated or nearly saturated with salt—and neutralize any free alkali contained in the lye with a suitable acid, such as hydrochloric acid, and then add a suitable iron salt—such as perchloride of iron—to the lye until no further precipitate is formed. The effect of this treatment is to purify the lye from the cyanogen compounds contained therein, which unite with the perchloride of iron, forming Prussian blue, and at the same time renders insoluble the fatty and resinous matters, which, together with the blue, form a precipitate, which is then removed from the clear liquor. This precipitate can be treated by known methods to extract the fatty matter from the blue, and thus render them fit for use in the arts. I next proceed to remove the sulphur compounds, and for this purpose I add to the lye an excess of acid, usually from three to four per cent. of strong hydrochloric acid. Other acid may be used, but hydrochloric is usually the most economical. I then heat the liquor and blow air through it until sulphurous acid ceases to be evolved. A convenient means for heating and maintaining the heat in the liquid is to heat the air on its passage between the pump or equivalent device and the liquid. Sulphurous acid passes off together with the air and is allowed to escape, or may be collected and utilized by known means, while sulphur is precipitated within the liquor.

To render the decomposition of the oxidizable sulpho compounds as complete as possible, I introduce chlorine into the liquor, preferably in the form of a solution of calcic chloro-hypochlorite, (commonly called "chloride of lime.") I add such liquor in small quantity from time to time until free chlorine is found to be present, when the operation is complete. I next remove the precipitate, from which the sulphur may be recovered by well-known means, and neutralize the lye with a suitable alkali, such as carbonate of soda or caustic soda, removing any further precipitate which may have been thus formed. The liquor thus obtained is fit to be boiled down for the recovery of salt and crude glycerine.

The first step described—namely, the treatment with lime and subsequent removal of the precipitate thus produced while useful and economical—is not essential to the working of the other features of the process.

I claim—

1. The herein-described improvement in the treatment of spent soap-lye containing cyanogen compounds, which consists in adding thereto acid and a suitable iron salt, such as perchloride of iron, to form a precipitate, substantially as described.

2. The herein-described improvement in the treatment of spent soap-lye containing sulphur compounds, which consists in adding thereto acid and chlorine, heating the liquid, and blowing air through it, substantially as described.

3. The herein-described improvement in the treatment of spent soap-lye, which consists in adding to it acid and a suitable iron salt, such as perchloride of iron, and removing the precipitate thus formed, adding acid again and chlorine, heating the liquor, and blowing air through it, substantially as described.

4. The herein-described improvement in the treatment of spent soap-lye, which consists in adding to it acid and a suitable iron salt, such as perchloride of iron, and removing the precipitate thus formed, adding acid again and chlorine, heating the liquor, and blowing air through it, then removing the precipitate thus formed, and neutralizing the liquor, substantially as described.

OTTO CHRISTIAN HAGEMANN.

Witnesses:
OLIVER R. JOHNSON,
A. E. MUNFORD,
*Consulate-General U. S. A., London.*